United States Patent [19]

Deiner et al.

[11] 4,433,027
[45] Feb. 21, 1984

[54] PROCESS FOR FINISHING TEXTILES WITH ALKOXYLATION PRODUCTS, AND COMPOSITIONS FOR THIS

[75] Inventors: Hans Deiner, Neusäss; Bernhard Sandner, Diedorf, both of Fed. Rep. of Germany

[73] Assignee: Ciba-Geigy Corporation, Ardsley, N.Y.

[21] Appl. No.: 448,553

[22] Filed: Dec. 10, 1982

Related U.S. Application Data

[63] Continuation of Ser. No. 153,389, May 27, 1980, abandoned.

[30] Foreign Application Priority Data

Jun. 1, 1979 [DE] Fed. Rep. of Germany ....... 2922376

[51] Int. Cl.$^3$ .......................... B32B 7/00; B05D 3/02
[52] U.S. Cl. .................................... 428/260; 252/8.6; 427/387; 427/389; 427/389.9; 427/393.2; 428/266; 428/264; 428/267; 428/270; 524/385; 524/767
[58] Field of Search .................. 427/387, 393.2, 389.9, 427/389, 434.4, 430.1, 428, 421; 252/8.6; 8/DIG. 1; 106/287.14, 287.16; 528/29, 26, 31, 495, 20; 525/479; 524/385, 806, 767; 428/245, 260, 264, 265, 267, 266, 274, 290

[56] References Cited

U.S. PATENT DOCUMENTS

| | | | |
|---|---|---|---|
| 2,588,366 | 3/1952 | Dennett ........................ | 8/DIG. 1 X |
| 2,658,908 | 11/1953 | Nitzsche et al. ................. | 528/29 X |
| 2,755,261 | 7/1956 | Clark .................................... | 524/385 |
| 3,079,281 | 2/1963 | Dexter et al. ..................... | 524/385 X |
| 3,242,079 | 3/1966 | McMillen .............................. | 252/33 |
| 3,384,586 | 5/1968 | McMillen .............................. | 252/33 |
| 3,453,124 | 7/1969 | Wurstner .............................. | 106/14 |
| 3,492,231 | 1/1970 | McMillen .............................. | 252/33 |
| 3,529,008 | 9/1970 | Brandeis et al. ................. | 260/448.8 |
| 3,748,275 | 7/1973 | Bernheim et al. ............... | 252/8.6 X |
| 4,098,572 | 7/1978 | Smith .................................... | 8/128 A |
| 4,098,701 | 7/1978 | Burrill et al. ........................ | 252/8.6 |
| 4,211,815 | 7/1980 | Deiner ................................. | 428/290 |
| 4,230,586 | 10/1980 | Bretz ................................. | 252/8.5 P |
| 4,264,363 | 4/1981 | Cech ................................. | 106/14.28 |

FOREIGN PATENT DOCUMENTS

| | | |
|---|---|---|
| 707564 | 4/1954 | United Kingdom . |
| 905776 | 9/1962 | United Kingdom . |
| 1136106 | 12/1968 | United Kingdom . |
| 1154724 | 6/1969 | United Kingdom . |
| 1202434 | 8/1970 | United Kingdom . |
| 1236100 | 6/1971 | United Kingdom . |
| 1300250 | 12/1972 | United Kingdom . |
| 1344336 | 1/1974 | United Kingdom . |
| 1511508 | 5/1978 | United Kingdom . |

OTHER PUBLICATIONS

Derwent Abstract 30,087Q.
I.C.F. vol. 8, Japan–Week, No. 168, pp. 50–51.
Chemical Abstracts, vol. 72, (1970), 33201f.
Derwent Abstracts CPI, 360,470, of Japan 73, 19,920.
Derwent Abstracts CPI, 73,937U, of Japan 73, 39,396.
Derwent Abstracts CPI, 2606X, of Japan 75, 63,298.
Derwent Abstracts CPI, 2587X, of Japan 75, 59,598.
Chemical Abstracts, 8882i, (1961), of German 1,060,347.
Chemical Abstracts, 127,468s, (1971), of German 1,917,701.
Derwent Abstract CPI, 78,658S, of Japan 71 42,353.
Derwent Abstract CPI, 19816T, of Japan 72 09,424.

*Primary Examiner*—Thurman K. Page
*Attorney, Agent, or Firm*—Edward McC. Roberts

[57] ABSTRACT

Alkoxylation products in form of solutions in organic solvents or, preferably, in form of aqueous emulsions, stable against hydrolytic influences are used in a process for finishing textile materials to impart to these an excellent soft, superficially smooth fell connected with the improvement of tearing strength, abrasion resistance and sewability.

The alkoxylation products are obtained by alkoxylation of hydrogen organopolysiloxanes, in particular of methyl hydrogen polysiloxanes with monovalent saturated and/or unsaturated alcohols having 4 to 22 C atoms.

11 Claims, No Drawings

PROCESS FOR FINISHING TEXTILES WITH ALKOXYLATION PRODUCTS, AND COMPOSITIONS FOR THIS

This is a continuation of application Ser. No. 153,389 filed on May 27, 1980, now abandoned.

The invention relates to the finishing of textiles with alkoxylation products. These are obtainable by reacting hydrogen-containing organopolysiloxanes with alcohols having 4–22 carbon atoms.

From DE-AS No. 1 594 911, it is known to treat textiles with tetrasilicic acid esters of long-chained unsaturated fatty alcohols or mixtures thereof with long-chained saturated fatty alcohols having an iodine number of at least 40. This treatment imparts a soft feel and improved abrasion resistance and tearing strength to the textiles. However, these silicic acid esters have the disadvantage that they are hydrolytically split, i.e. when the products have a pH of less than 7. As a result, this treatment can only be combined with the conventional crease-resistant finish, for example, under certain conditions. Furthermore, the effects do not meet present-day requirements in every case.

The aim of this invention is therefore to provide textile treating agents which are substantially resistant to hydrolysis and impart an excellent soft, superficially smooth feel to the treated textiles and at the same time further improve the tearing strength and abrasion resistance.

The invention relates to a process for finishing textile-materials by applying thereto an alkoxylation product in the form of a solution in an organic solvent or, preferably, in the form of an aqueous emulsion, and heating. The alkoxylation product is obtained by alkoxylation of a hydrogen containing organopolysiloxane with at least one monovalent saturated or unsaturated alcohol having 4 to 22 C atoms. Advatangeously the solution and the aqueous emulsions of the alkoxylation product are combined wither other conventionally used textile finishing agents (adjuvants).

A further object of the invention is a composition comprising an aqueous emulsion of the said alkoxylation product to be used for the inventive process, or an solution in an organic solvent, respectively.

Another object of the invention is the textile material treated according to the aforesaid inventive process.

The hydrogen-containing organopolysiloxanes used to prepare the alkoxylation products to be used according to the invention contain hydrogen bonded to silicon. These include, in particular, alkyl hydrogen polysiloxanes, especially methyl hydrogen polysiloxanes, but also ethyl hydrogen polysiloxanes. In addition, cohydrolysates of hydrolysable silanes which contain hydrogen atoms bonded to silicon and hydrolysable silanes which do not contain any hydrogen atoms bonded to silicon are also used as starting materials. The molar ratio of the silanes which contain hydrogen atoms bonded to silicon to the silanes which do not contain any hydrogen atoms bonded to silicon may be up to 1:6. The average molecular weight of these polysiloxanes is up to 12,000. However, for economic reasons, the alkyl hydrogen polysiloxanes with a ratio of alkyl group to hydrogen (not including the terminal groups) of 1:1 and again the methyl hydrogen polysiloxanes are preferred for the reaction.

Saturated and/or unsaturated alcohols with 4 to 22 C atoms, which may be either straight-chained or branched, are used as the second component for the preparation of the alkoxylation products. The position of the OH group is of no significance. It is preferred to use saturated alcohols with 4 to 8 C atoms, and more particularly it is preferred to use singly or multiply unsaturated alcohols with 11 to 18 C atoms. In fact, the alkoxylation products prepared therewith are liquid and therefore easy to handle and emulsify, and give exceptional results which are particularly striking in the case of alkoxylation products with a long-chained alkenyloxy group. In the case of alkoxylation products wherein the alkenyl group has 11 to 18 C atoms, there is the added advantage of being economical, as a particularly favourable ratio of the amount of hydrogen-containing organopolysiloxane to the amount of fatty alcohol is obtained with these products.

The following alcohols are cited by way of example: n-butanol, i-butanol, n-hexanol, 2-ethylbutanol-(1), n-octanol, octanol-(2), 2-ethylhexanol-(1), lauryl alcohol, hexadecanol-(1), stearyl alcohol, behenyl alcohol, n-undecen-(11)-ol-(1), oleyl alcohol and linoleyl alcohol ($C_{17}H_{31}CH_2OH$).

The industrial grade alcohols are generally used.

Alkoxylation of the hydrogen-containing organopolysiloxanes is carried out in known manner (cf. DE-PS No. 896 414 and U.S. Pat. No. 2,658,908, and JP patent application No. 72 09 424, listed under Accession No. 19 816 T (1972) in the "Central Patents Index," Derwent Publications Limited, London). The method is generally that the saturated and/or unsaturated alcohol and the catalyst, particularly a basic compound, especially sodium alcoholate dissolved in alcohol, are prepared and the hydrogen-containing organopolysiloxane is then added dropwise, with stirring, at elevated temperature. If required, some more catalyst can be added to complete the reaction after all the hydrogen-containing organopolysiloxane has been added. If the alcohol is used in a deficient amount (see below) only some of it is put in at the beginning and reacted with the hydrogen-containing organopolysiloxane, and the rest is brought into the reaction by being added dropwise together with the hydrogen-containing organopolysiloxane. Finally, the mixture is left to continue reacting for up to 5 hours at elevated temperature. The reaction to form the alkoxyalkylpolysiloxane occurs according to the following diagram:

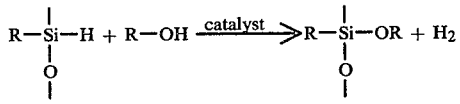

The reaction of hydrogen-containing organopolysiloxane and saturated and/or unsaturated alcohol is preferably effected in a ratio of 0.75 to 1, more particularly 0.9 to 1 mole alcohol per equivalent of Si-H group in hydrogen-containing organopolysiloxane. With the particularly preferred ratio, at least 90 mole % of the hydrogen atoms of the hydrogen-containing organopolysiloxane are alkoxylated and products are then obtained which are particularly effective and also have considerable economic advantages. Alkoxylation products wherein less than 50 mole % of the H atoms of the hydrogen-containing organopolysiloxane are alkoxylated are of no importance for practical purposes.

The alkoxylation products are preferably applied from an aqueous emulsion. The emulsions are prepared in known manner. The alkoxylation products used as textile treating agents according to the invention are preferably converted directly into approx. 25% to 45% emulsions (based on the alkoxylation product) by adding emulsifiers. However, the alkoxylation products may also be emulsified in the form of a solution in a suitable organic, water-insoluble solvent (perchloroethylene, butyl acetate, toluene, higher petrol fractions, mixtures of these solvents, etc.).

The emulsifiers are also known. Preferably, to prevent problems when the agents are combined with other textile finishing agents, non-ionogenic emulsifiers are used, such as e.g. polyvinyl alcohols in aqueous solution, ethoxylated fatty acid amides, ethoxylated fatty amines and ethoxylated fatty alcohols. However, anionic and cationic emulsifiers, e.g. quaternary ammonium compounds such s e.g. octadecyloxymethylpyridinium chloride, or sodium sulphonates, such as e.g. dodecylbenzene-Na-sulphonate, are also suitable, although if they are to be combined with catalysts for a crease-resistant finish or with optical brighteners and similar compounds, their compatibility must be checked beforehand. The abovementioned emulsifiers are chiefly known for emulsifying organopolysiloxanes (cf. for example DE-PS No. 1 060 347, U.S. Pat. Nos. 3,320,197, 3,729,437 and 3,748,275, and DE-OS No. 1 917 701). The amounts of emulsifier used are also within the usual range, i.e. about 2 to 20, more particularly 6 to 15% by weight, based on the alkoxylation product, are used.

Preferably, the aqueous emulsions prepared as described above are used for treating the textiles which are thus given a soft feel and smooth surface, in particular, and at the same time the tearing strength and abrasion resistance are noticeably increased. The sewability of the treated textiles, particularly knitted materials, is also significantly improved. Generally, 15 to 70 g/l of the aqueous emulsions of the alkoxylation products are used, depending on the concentration and the material which is to be treated. The textiles are foularded with the baths to give a bath uptake of about 60 to 100% and merely dried at 80° to 110° C. Obviously, other known methods of application such as spraying and nip-padding are also suitable, whilst the amounts to be used should be varied according to the bath uptake.

Application in an organic solvent is also possible. For this, the alkoxylation products are dissolved in suitable water-insoluble solvents (see paragraph concerning the preparation of emulsions) in amounts of from 5 to 40 g/l, depending on the bath uptake, and are treated in known manner by immersion and squeezing out, or by spraying.

The treatment described above may readily be carried out as it is. However, it is preferable to add other adjuvants conventionally used in the textile industry to the finishing bath, in order to impart a number of advantageous properties to the textiles in a single operation. These adjuvants include, in particular, agents for improving crease-resistance. However, a combination with conventional fluorine chemicals and hydrophobic agents is also possible, obviously with the addition of the relevant catalysts if required. For the combined finishing treatment, smaller amounts of the emulsions, generally from 10 to 50 g/l, are totally sufficient. This combined finishing treatment is also carried out in known manner, i.e. the treated textiles finally have to be condensed (cured) for a period of a few seconds to a few minutes, at temperatures of from 120° to 160° C., depending on the particular case.

When the solvent method of application is used, obviously only additives which are correspondingly soluble are suitable. It may also be advantageous to use the agents according to the invention for coating, namely in those places where a soft feel is required. Thus, the alkoxylation products can advantageously be used particularly for coating the backs of upholstery fabrics. Coating is effected in known manner.

According to the invention, the finish is applied to textiles of all kinds. The term textiles refers in particular to woven and knitted fabrics. The alkoxylation products used according to the invention are particularly suitable for treating textiles which consist of cellulose fibres or contain at least some cellulose fibres (native and regenerated cellulose fibres). As fibres to be mixed there are coming into question synthetic fibres such as polyester, polyamide or polyacrylontrile fibres, and also wool. However, it is also obviously possible to treat textiles consisting of synthetic fibres and wool, respectively.

The advantages of the compositions used according to the invention are, on the one hand, that they are substantially resistant to hydrolysis and can readily be combined with, in particular, acidic treating agents. Moreover, these compositions give the treated textiles a particularly smooth, soft surface feel, with a marked reduction of fabric stiffness and the tearing strength and abrasion resistance are improved considerably. In addition, the sewability of the treated materials is very good after the treatment. These effects are superior to those obtained according to the prior art.

PREPARATION OF THE ALKOXYLATION PRODUCTS

Product A 82 kg of oleyl alcohol (305 mole) and 0.03 kg of 20% sodium oleylate solution in oleyl alcohol are taken, heated to 140° C., and within 1 hour, 18 kg of standard commercial methyl hydrogen polysiloxane (density approx. 1.0 at 20° C.; viscosity 20 to 30 mPa.s at 20° C.) are added dropwise, with stirring. Then 0.15 kg of 30% sodium methoxide solution in methanol are added and the mixture is stirred for 20 minutes at 140° C. The methyloleyloxypolysiloxane obtained does not split off any more hydrogen under alkaline conditions.

Product B

Of 285 mole of n-butanol, 26.7 mole are taken and heated to 118° C. together with 0.03 kg of 20% sodium oleylate in oleyl alcohol. Then 1.69 kg of methyl hydrogen polysiloxane (for details, see product A) are added, from an amount of 18 kg. The remaining quantities of n-butanol and methyl hydrogen polysiloxane are then added simultaneously and uniformly within 1 hour, whilst hydrogen is split off when the temperature is increased to 140° C. The alkoxylation product obtained still contains small amounts of silicon-bonded hydrogen which can be split off under alkaline conditions.

Product C 276 mole of linoleyl alcohol and 18 kg of methyl hydrogen polysiloxane (for details, see product A) are reacted at 140° C. in the manner described under product B.

Product D

In the manner described under product C, 240 mole of n-undecen-(11)-ol-(1) and 40.2 kg of silicon copolymer blocked with trimethylsilyl in the end position (cohydrolysate from dimethyldichlorosilane and methyl hydrogen dichlorosilane in a molar ratio of 1:1, viscosity 240 mPa.s at 20° C.) are reacted.

Product E 260 mole of 2-ethylhexanol-(1) and 18 kg of methyl hydrogen polysiloxane (for details, see product A) are reacted in the manner described under product C.

Product F 160 mole of lauryl alcohol and 18 kg of methyl hydrogen polysiloxane (viscosity 50 mPa.s at 20° C.) are reacted in the manner described under product C.

It is particularly preferred to use the alkoyxlation products in the form of aqueous emulsions. An aqueous emulsion of products A to F can be prepared as follows:

585 l of water are placed in a reaction boiler. In a separate reaction vessel, 33 kg of emulsifier ($C_{16-18}$ fatty alcohol, ethoxylated with 40 mole ethylene oxide per mole of fatty alcohol) are dissolved in 70 l of water at 40° to 60° C. and then poured into the reaction boiler. Then 330 kg of product A are mixed in and the mixture is adjusted to a pH of 7.8 to 8.5 with half-concentrated hydrochloric acid. Finally, the mixture is homogenised at high pressure at 20° to 30° C. and at 260 to 350 bar.

Products B to F can be emulsified in the same way, although it might be necessary to melt the products before mixing them in.

Similarly, other emulsifiers and mixtures of emulsifiers may be used to prepare the emulsions, and of course it is possible to prepare more dilute and more concentrated emulsions.

It is also possible to dissolve the alkoxylation products in a water-insoluble solvent before emulsification and to emulsify this solution.

The improved resistance to hydrolysis of the alkoxylation products used according to the invention is shown by the following comparative test:

100 parts by weight batches of the emulsion prepared according to Example 1 of DE-AS No. 1 594 911 are adjusted with water to a content of about 32% by weight active substance, and the batches are adjusted with hydrochloric acid to a pH value of 1 (product I) and 2 (product II).

In the same way, 100 g batches of the emulsion prepared as described above are also adjusted with hydrochloric acid to a pH value of 1 (products III) and 2 (product IV).

The resistance to hydrolysis is determined from the storage characteristics:

| Product | | Storage at room temperature |
|---|---|---|
| I | } prior art | Emulsion solid after 5 days |
| II | | Emulsion solid after 10 days |
| III | } according to the invention | Emulsion still good after 1 month |
| IV | | Emulsion still stable after 1 month |

Only the emulsions III and IV according to the invention are resistant to acid components.

The treatment of the textiles according to the invention is carried out as follows:

EXAMPLE 1

A cotton poplin (approx. 124 g/m$^2$) is foularded with the following bath to give a bath uptake of 75%:
- 60 g/l of the mixed product used in Example 2 of U.S. Pat. No. 4,102,840,
- 18 g/l of $MgCl_2.6H_2O$ and
- 30 g/l of the emulsion (approx. 32%) prepared using product A.

The fabric is then dried at 100° C. for 10 minutes and condensed at 150° C. for 5 minutes.

The technical effects are shown in the following Table; as a comparison, the following treatments were also carried out:

Treatment A: As described above, but without the emulsion of product A.

Treatment B: As described above, but, instead of the emulsion of product A, using the same amount (based on active substance) of an emulsion prepared according to Example 1 of DE-AS No. 1 594 911.

| Treatment | Elmendorf tearing strength (in cN) | Accelerator abrasion resistance 3000 rpm and 3 mins. (abrasion in %) | Feel |
|---|---|---|---|
| according to the invention | 1140 | 8.9 | 1 |
| A (comparison) | 690 | 12.3 | 5 |
| B (prior art) | 1100 | 9.6 | 2–3 |
| untreated | 860 | 4.3 | 3 |

The crease-resistance is approximately equally favorable with all the treatments.

The following key is used to assess the feel:
1 = smooth surface, very soft feel
2 = very soft feel
3 = soft feel
4 = dry, not very soft feel
5 = dry, solid feel

EXAMPLE 2

A cotton mesh fabric (approx. 100 g/m$^2$) is foularded with the following bath to give a bath uptake of 83%:
- 60 g/l of a 42% aqueous solution of polymethylolurea modified with monoethanolamine,
- 10 g/l of a 60% aqueous solution of pentamethylolmelaminetetramethyl ether,
- 50 g/l of a 30% aqueous emulsion of dimethylpolysiloxane (viscosity 680 mPa.s at 20° C.) and polyethylene in a weight ratio of 3:1,
- 30 g/l of a 36% emulsion prepared using product B,
- 20 g/l of a 30% aqueous formulation of polyglycol ester of coconut oil acid (polyethylene glycol 400 as the alcohol component) and
- 14 ml/l of a 35% aqueous solution of 2-amino-2-methyl-propanolhydrochloride (pH value 7.5).

The material is dried at 110° C. for 10 minutes and condensed at 145° C. for 6 minutes. A fabric with a very good crease-resistant finish is obtained, having a pleasant, specifically soft feel.

EXAMPLE 3

A rayon staple fabric (180 g/m$^2$) is foularded in a bath with a squeeze-out effect of 92%, this bath containing, per liter, 60 g of a 35% emulsion prepared using product C. The fabric is then dried at 110° C. A material with a smooth surface and very soft feel is obtained.

If an emulsion prepared using product F is used in the same way, again a very soft feel is obtained, but the surface is less smooth.

EXAMPLE 4

30 g/m², based on solids, of the following emulsion are applied by the nip-padding method to an upholstery fabric (450 g/m²):
- 150 g/l of a 48% aqueous non-ionogenic copolymer emulsion (butyl acrylate and vinyl acetate in a molar ratio of 3:2),
- 20 g/l of a 30% aqueous formulation of polyglycol ester of coconut oil acid (see Example 2) and
- 20 g/l of a 30% emulsion prepared using product D.

The material is then dried at 170° C. for 1 minute.

From the point of view of its feel, the upholstery fabric has the known advantageous properties and also the abrasion resistance of the film of polymer is fully maintained.

EXAMPLE 5

A bleached polyester/cotton poplin (50/50) (102 g/m²) is foularded with a bath with a squeeze-out effect of 62%, this bath containing:
- 60 g/l of a 76% aqueous solution of a dimethyloldihydroxyethylene urea etherified with methanol,
- 18 g/l of $MgCl_2.6H_2O$,
- 0.2 g/l of sodium fluoroborate,
- 40 g/l of a non-ionogenic emulsion (13.5% of standard commercial silicon rubber and 13.5% polyethylene) and
- 40 g/l of the emulsion prepared using product A.

The material is then dried at 105° C. and condensed at 150° C. for 5 minutes. The fabric is given a crease-resistant finish. It has a pleasantly soft feel with a smooth surface and high abrasion resistance and tearing strength. Its sewability is very good.

EXAMPLE 6

20 g of product E are dissolved in 1000 g of perchloroethylene. A rayon staple/polyester muslin (67/33) (152 g/m²) is impregnated with this solution and squeezed out to give a bath uptake of 120%. Finally, it is dried at 100° to 110° C. in the usual way. The treated fabric has a very soft feel with a smooth surface.

EXAMPLE 7

A cotton dress material (106 g/m²) is foularded with the following bath to give a bath uptake of 75% and is then finished as described in Example 1:
- 60 g/l of the mixed product using in Example 2 of U.S. Pat. No. 4 102 840,
- 30 g/l of the silicon rubber/polyethylene emulsion described in Example 5,
- 6 g/l of the methyl hydrogen polysiloxane emulsion prepared in Example 1 of U.S. Pat. No. 3,748,275,
- 3 g/l of an aqueous, approximately 10%, non-ionogenic zinc soap emulsion,
- 40 g/l of an emulsion prepared using product A, and
- 18 g/l of $MgCl_2.6H_2O$.

The fabric is permanently crease-resistant and hydrophobic and has a particularly smooth surface and soft feel. The mechanical effects are outstanding.

What we claim is:

1. A process for finishing a textile which comprises applying to the textile a diluted composition which contains an emulsified or dissolved alkoxylation product of a hydrogen organopolysiloxane with at least one monovalent unsaturated alcohol having 11 to 18 carbon atoms, and heating the treated textile materials.

2. A process according to claim 1 wherein the hydrogen atoms of the hydrogen organopolysiloxanes are alkoxylated to at least 75 mole % with the alcohol.

3. A process according to claim 1 wherein the hydrogen atoms of the hydrogen organopolysiloxanes are alkoxylated to at least 90 mole % with the alcohol.

4. A process according to claim 1 wherein the hydrogen organopolysiloxane to be alkoxylated is a methyl hydrogen polysiloxane.

5. A process according to claim 1 wherein the said heating is effected at temperatures of from 80° to 160° C.

6. A process according to claim 1 wherein the composition comprises an aqueous emulsion of the alkoxylation product.

7. A process according to claim 6 wherein the aqueous emulsion further contains an agent to increase crease-resistance, hydrophobic agents or mixtures thereof.

8. A process according to claim 1 wherein the composition comprises a solution of the said alkoxylation product in a water-insoluble solvent.

9. A compsotion for use in finishing a textile which comprises an aqueous emulsion of an alkoxylation product of a hydrogen organopolysiloxane with at least one monovalent unsaturated alcohol having 11 to 18 carbon atoms.

10. A composition according to claim 9 wherein the hydrogen organopolysiloxane to be alkoxylated is a methylhydrogen polysiloxane.

11. A textile treated according to the process of claim 1.

* * * * *